United States Patent
Donnelly et al.

[11] 3,713,766
[45] Jan. 30, 1973

[54] OIL BURNER CONTROL SYSTEM

[75] Inventors: Donald E. Donnelly, Edwardsville; Robert C. Krump, Waterloo, both of Ill.

[73] Assignee: Emerson Electric Co., St. Louis, Mo.

[22] Filed: Sept. 7, 1971

[21] Appl. No.: 178,099

[52] U.S. Cl. ................................................431/69
[51] Int. Cl. .................................................F23n 5/20
[58] Field of Search ............431/69, 70, 71; 317/86

[56] References Cited

UNITED STATES PATENTS

| | | | |
|---|---|---|---|
| 3,247,887 | 4/1966 | Matthews | 431/71 |
| 3,273,019 | 9/1966 | Matthews | 431/69 X |
| 3,489,500 | 1/1970 | Giuffrida et al. | 431/69 X |
| 3,610,790 | 10/1971 | Lindberg | 431/69 |
| 3,664,803 | 5/1972 | Cade | 431/69 |

*Primary Examiner*—Edward G. Favors
*Attorney*—Charles E. Markham

[57] ABSTRACT

An automatic control system in which electrically operated fuel and air supply and ignition means are energized at supply line voltage through a circuit controlled by a thermal time switch and a solid state switch; the system further including gating means for the solid state switch under control of a small sensitive electromagnetic relay having two windings parallel connected in a low voltage thermostat circuit. Closure of the small relay to effect conduction of the solid state switch requires energization of one or both of its windings but requires only the energization of the other of the windings to hold it closed, current flow through the other or hold-in winding being rectified and capacitance filtered with sufficient capacitance to retain hold-in energization through momentary interruptions of the thermostat circuit; the system further including an electrical resistance heater series connected with the one relay winding and operative when energized for a short predetermined period of time to heat and open the thermal time switch, and flame responsive switching means operative to instantly de-energize the resistance heater and the one series connected relay winding when flame appears at the burner.

10 Claims, 1 Drawing Figure

PATENTED JAN 30 1973
3,713,766
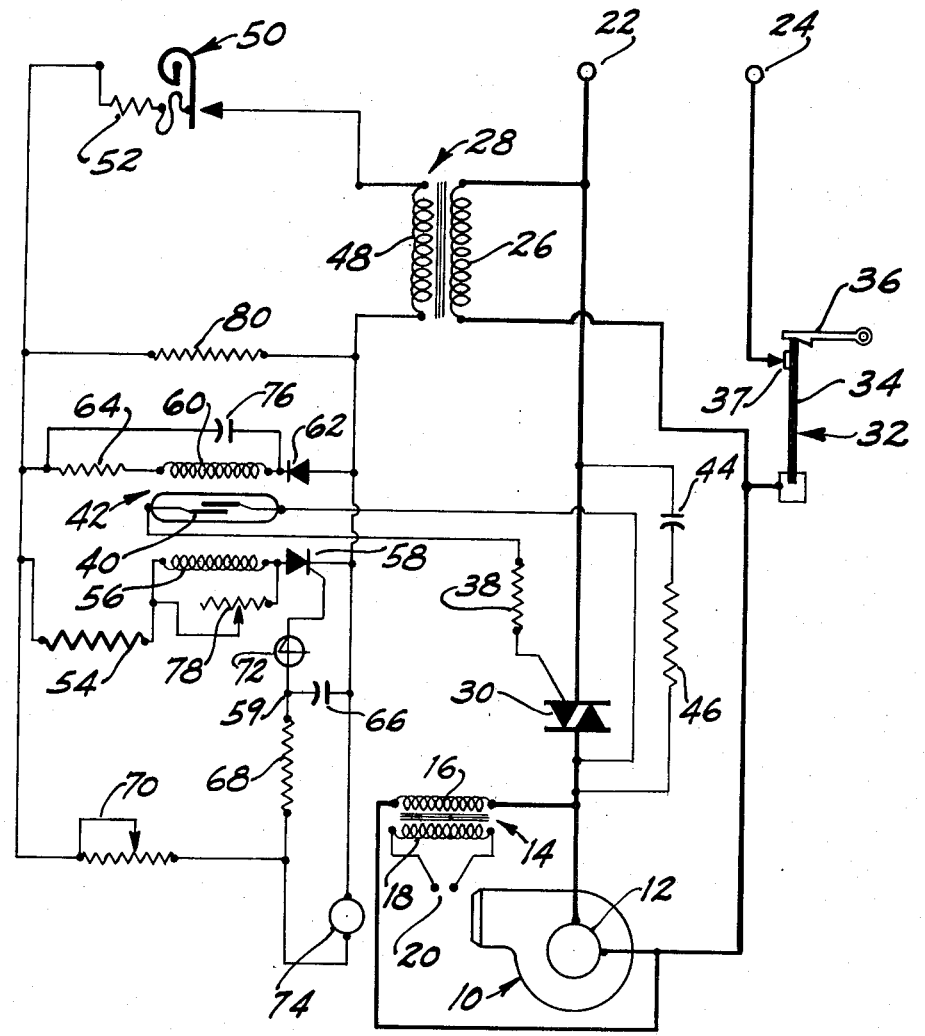
INVENTORS
DONALD E. DONNELLY
ROBERT C. KRUMP
BY Charles E. Markham
THEIR AGENT

OIL BURNER CONTROL SYSTEM

This invention relates to burner control systems in which fuel is supplied to a burner for a predetermined short trial period during which an igniter is operated, in which the fuel supply is continued thereafter provided combustion of the fuel occurs within the trial period but is cut off if combustion fails to occur within the trial period, or, if having occurred, it subsequently fails.

The invention is particularly related to means obviating problems attending the use of conventional a.c. operated electromagnetic relays having their windings in the low voltage thermostat circuit and their relatively large capacity contacts controlling operation of a fuel supply or solenoid valve, blower, and ignition means in a circuit connected directly across the available a.c. commercial power supply.

One of the frequently occurring problems is caused by vibration of the building wall on which the space thermostat is mounted. These vibrations frequently cause momentary separation of the lightly closed contacts of sensitive space thermostats, resulting in objectionable chattering or even dropping out of the relay. Each time the relay drops out the system is required to repeat the starting cycle in order to re-establish burner operation.

Another problem is encountered when operating an electromagnetic relay at one level of energization to "pull in" the relay and then at a lower level to "hold in," but not "pull in," the relay. This problem arises from variations in commercial power supply voltage which not only frequently varies considerably from one locale to another but from time to time in the same locale.

It is essential to the safe operation of the burner that fuel cannot be supplied thereto under no-flame starting conditions unless some means such as the usual thermal time switch resistance heater is also energized to effect opening of the thermal time switch if combustion does not occur within a predetermined time. A conventional method of assuring operation of this safety provision is to energize the fuel supply winding relay at a relatively high pull-in level through a series connected thermal time switch resistance heater and then to switch out the resistance heater and reduce the current flow through the relay winding to a relatively low hold-in, but not pull-in, level by flame responsive switching means when combustion flame appears. The resistance heater for the thermal time switch is therefore energized whenever sufficient current flows through the relay winding to pull in the relay.

This arrangement is operative by virtue of the differential in electromagnetomotive forces or flux required to pull in and hold in an electromagnetic relay. This differential in force requirements, while sufficient to facilitate the reliable operation of conventional a. c. operated relays in this manner under conditions of relatively constant supply voltage, is not, however, sufficient to permit reliably maintaining a hold-in but not pull-in level of flux under conditions of commercial power supply voltage variations encountered in practice.

The relay winding in this arrangement must be designed so as to provide sufficient flux to hold in but not pull in the relay when energized at the lower level, even though the flux may be increased due to an increase in supply voltage. On the other hand, the design of the relay winding must also be such as to provide sufficient flux to hold in the relay even though the flux may decrease due to a decrease in the supply voltage; otherwise, the relay contacts may chatter between open and closed or drop out. Obviously, reliable operation of the conventional a. c. relay in this manner is limited therefore to a finite range of supply voltage variation.

It has been found that reliable operation of an electromagnetic relay in this manner may be extended over a considerably wider range of supply voltage variation if the hold-in but not pull-in flux is generated in a separate hold-in relay winding, through which the current flow is rectified and capacitance filtered, and the additional flux required to pull in the relay is supplied by a second relay winding. Moreover, in this arrangement, it is economically practical to provide a capacitance filter connected across the hold-in winding large enough to sustain a hold-in flux during momentary circuit interruptions if the relay is made small enough so as to require only a relatively small electromagnetic force to hold it in.

It is an object therefore of the present invention to provide a generally new and improved control system for oil burners in which a small sensitive relay having two parallel connected windings closes to effect a supply of fuel to a burner when the one or both of its windings are energized, the one winding being connected in series with the resistance heater of a thermal time switch operative to cut off the fuel supply when its heater is energized for a predetermined short period, the other winding being capable of holding in the relay but being incapable of pulling in the relay alone, and in which burner flame responsive switching means effects de-energization of the resistance heater and the series connected relay winding when burner flame appears.

A further object is to provide a control system as characterized in the preceding paragraph in which the electrically operated fuel supply means is energized by a. c. power at supply voltage through a circuit under control of the thermal time switch and a signal controlled solid state switch and in which gating of the solid state switch is controlled by the small sensitive relay having its two parallel connected windings operating on a low voltage a. c. power source under control of a space thermostate.

A further object is to rectify and filter the flow of current through the other hold-in relay winding in the above arrangement, thereby to extend the range of supply voltage variation through which the hold-in winding will reliably hold in but not pull in the relay.

A further object is to maintain energization of the hold-in winding during momentary interruptions of the thermostat circuit.

Further objects and advantages will become apparent from the following complete description of the invention when read in connection with the accompanying drawing.

The single FIGURE of the drawing is a diagrammatic illustration of an oil burner control system constructed in accordance with the present invention.

Referring to the drawing, the system comprises an oil burner 10 having an electric motor 12 operative to supply fuel and air to burner 10, an igniter 14 having a primary winding 16, a secondary winding 18, and a pair of spaced spark electrodes 20 disposed adjacent burner 10. The burner motor 12 is connected across a.c. power source terminals 22 and 24 in parallel with the igniter transformer primary winding 16 and in series with a bi-directional, signal controlled, solid state switch 30 (Triac), and a normally closed thermal time switch 32 having a bimetal blade 34 and a pivoted latch 36.

The control electrode of Triac 30 is connected to the anode side thereof through a gating circuit which includes in series arrangement a current limiting resistor 38 and the contacts 40 of a small, sensitive, electromagnetically operated reed switch 42. When the contacts 40 are closed due to energization of the relay windings to be described, gating of the Triac is completed each half cycle of the power supply, and when contacts 40 are open, the Triac 30 is non-conductive. The upper end of bimetal blade 34 of the thermal time switch 32 warps toward the right to open the switch contacts 37 when the blade is heated at a predetermined rate for a predetermined time by a resistance heater to be described, thereby to break the motor and igniter circuit.

The upper end of bimetal blade 34 is engaged by the latch 36 so that manual resetting of the switch is required to reinstate operation. A capacitor 44 connected across Triac 30 compensates for phase shifting which may otherwise occur across the Triac 30 due to inductive reactance in the motor, and a resistor 46 connected in series with capacitor 44 precludes an instant discharge of capacitor 44 through the Triac.

A voltage step-down transformer 28 having a primary winding 26 connected across terminals 22–24 and a secondary winding 48 provides low voltage a.c. power for a circuit under control of a space thermostat 50. This low voltage circuit includes in series arrangement the transformer secondary winding 48, the space thermostat 50, an electrical resistance anticipator 52 for thermostat 50, a thermal time switch heater 54, a first winding 56 for the relay 42, and a silicon controlled rectifier (SCR) 58. A second hold-in winding 60 for the relay 42 is also provided.

The hold-in winding 60, a diode 62, and a resistor 64 are series connected in parallel with the relay winding 56, the thermal switch heater 54, and the SCR 58. The diode 62 and SCR 58 are arranged in opposed polarity in the thermostat circuit. The energization of winding 56 is required to effect the closure of normally open contacts 40. Energization of only the hold-in winding 60 produces sufficient flux to hold contacts 40 closed, but will not close them.

A gating circuit for the SCR 58 comprises a capacitor 66, a fixed resistor 68, and a variable resistor 70 series connected across SCR 58, and a solid state, voltage break-down, triggering element 72 connected between the SCR control electrode and a point 59 in the gating circuit between capacitor 66 and resistor 68. A photoconductive cell 74 connected across the capacitor 66 and resistor 68 is operative when it sees flame at burner 10 to shunt the gating of SCR 58.

A capacitor 76 connected across the hold-in winding 60 and resistor 64 acts in connection with the winding to filter the half wave rectified current flow therethrough. The capacitor 76 has sufficient capacitance to maintain hold-in energization of the relay winding 60 through momentary interruptions of the thermostat circuit. A calibrating resistor 64 is connected in series with capacitor 76 to determine the current flow through winding 60. A manually variable resistor 78 connected across winding 56 provides adjustment of the current flow through pull-in winding 56 and thereby adjusts the flux level of the winding 56. A resistor 80 connected across the power source, the thermostat, and the electrical resistance thermostat anticipator 52 permits sufficient current flow through the anticipator during burner operation when the SCR 58 is not conducting.

OPERATION

Upon closure of the space thermostat 50, current flow in one direction through hold-in winding 60 of the electromagnetic reed switch 42 during the conductive half cycles of diode 62. During the conductive half cycles of SCR 58, capacitor 66 in the SCR gating circuit charges to a voltage which effects breakdown of the triggering element 72, whereupon capacitor 66 discharges applying a strong firing signal to the SCR control electrode. Current now flows through the time switch heater 54 and the winding 56 of the relay 42 in a direction opposite to that flowing through hold-in winding 60. Under these conditions no flame exists at the burner 10, so that the resistance of the photoconductive element 74 is substantially infinite.

The energization of relay winding 56 provides sufficient flux to pull in or close the contacts 40 of the relay 42. Closure of contacts 40 completes the circuit to gate the Triac 30, and the burner motor 12 and igniter transformer primary winding 16 are thereby energized. Fuel and air are now supplied to burner 10, and igniter 14 is operative to ignite the mixture. These conditions persist until either combustion of the fuel occurs or until the bimetal safety switch 32 warps open, terminating the trial period and de-energizing the entire system.

Under conditions of normal operation, combustion occurs well within the trial period, and the resistance of the photoconductive element 74, due to radiant energy of the combustion flame drops sufficiently to shunt the capacitor 66, thereby to preclude its charging to the breakdown voltage of triggering element 72. As a result, SCR 58 becomes non-conductive so that the safety switch heater 54 and relay winding 56 are de-energized. The relay contacts 40 will, however, be held closed by the hold-in winding 60, and the burner will continue to operate until the thermostat 50 opens to de-energize relay winding 60. The relatively low resistance of the series connected thermostat anticipator 52 requires a greater flow of current therethrough to provide the required heat output than will flow through winding 60 and resistor 64 when SCR 58 is not conducting. The resistor 80 connected in parallel with winding 60 provides the necessary additional current flow through anticipator 52.

Under conditions of abnormal operation wherein combustion fails to occur during the trial period, the bimetal switch blade 34 of the thermal time switch 32 will warp and effect the opening and latching open of the switch. When this occurs the entire system is de-energized and manual unlatching or resetting of the thermal time switch is required. If burner flame is extinguished for any reason during burner operation after the resistance heater 54 has been de-energized, the resistance of the photoconductive element 74 will again rise and permit the gating and conduction of SCR 58, thereby re-energizing the resistance heater 54 and initiating a trial period after which burner motor operation is shut down unless combustion reoccurs within the trial period.

If, during normal burner operation, the electrical power supply fails for an interval sufficient to extinguish the burner flame, the SCR 58 will become conductive, effecting a pull in of relay 42 and the energization of the resistance heater 54, thereby initiating a trial period. If, on the other hand, the power supply is interrupted momentarily or the thermostat circuit is interrupted momentarily as by vibration of its contacts, the discharging of capacitor 76 will maintain hold-in energization of the relay 42 during such interruptions.

Capacitance filtering may be practically employed when the current load is small, as in the hold-in winding of the small sensitive reed-type relay 42 functioning only to control the gating circuit of a solid state switch. Moreover, it is economically practical when the current load is this small to provide a filtering capacitor having sufficient capacitance to maintain hold-in energization of the relay contacts through momentary circuit interruptions. The capacitance of capacitor 76 relative to the impedance of winding 60 is sufficient to maintain hold-in energization of the winding for considerably greater periods than the non-conductive half cycles of the rectified a.c. power supply.

It is to be understood that relay winding 56 may be designed so that energization thereof alone will pull in relay 42, or it may be designed so that the energization of winding 60 is also required to generate enough flux to pull in the relay.

We claim:

1. In a burner control system, an a. c. power source, a burner, a normally open relay operative when closed to effect a supply of fuel to said burner, a pair of windings for said relay the energization of one of which is required to close said relay, the other winding being incapable of closing said relay alone when energized but being capable of holding the relay closed, circuit connections connecting said other winding, a diode and a space thermostat in series relationship across said power source, circuit connections connecting said one winding, a resistance heater, and a flame responsive switch in parallel with said other winding and said diode and in series with said thermostat, said resistance heater being operative when energized for a predetermined short time to cut off the fuel supply to the burner, said flame responsive switch being responsive to the appearance of flame at said burner to de-energize said other winding and said resistance heater, and a filtering capacitor connected across said other winding.

2. A burner control system claimed in claim 1 in which said filtering capacitor has sufficient capacitance to maintain hold-in energization of said other winding through periods of circuit interruption considerably greater than the non-conductive half cycle periods of said diode.

3. The burner control system claimed in claim 1 in which said flame responsive switch is a unidirectional solid state switch arranged in opposite polarity with respect to said diode, whereby current flow through said windings is unidirectional and opposite.

4. The burner control system claimed in claim 1 in which said one winding is capable of closing said relay.

5. The burner control system claimed in claim 1 in which energization of both windings is required to effect closure of said relay.

6. In a burner control system, a burner, an a.c. power source, electrically operated means for supplying fuel to said burner, signal controlled solid state switching means, a normally closed thermal time switch and a voltage step-down transformer, circuit connections connecting said electrically operated means, said solid state switching means, and the primary winding of said transformer across said power source in series with said thermal time switch, a gating circuit for said solid state switching means including a normally open relay which when closed effects conduction of said solid state switch, a pair of windings for said relay, the energization of one of which is required to close the relay, the other of said windings is incapable when energized of closing said relay but is capable of holding it closed, a secondary winding for said transformer, a space thermostat, a resistance heater operative when energized for a predetermined short time to effect opening of said thermal time switch and flame responsive switching means, circuit connections connecting said thermostat, said resistance heater, said one relay winding, and said flame responsive switching means in series relationship across said transformer secondary winding, and circuit connections connecting said other winding in parallel with said resistance heater, said one winding, and said flame responsive switching means, and in series with said thermostat and said transformer secondary winding, and said flame responsive switching means being operative in response to the appearance of flame at said burner to de-energize said resistance heater and said one winding.

7. A burner control system as claimed in claim 6 in which said signal controlled solid state switching means is a Triac.

8. A burner control system as claimed in claim 7 which further includes diode means effecting a unidirectional current flow through said other relay winding.

9. A burner control system as claimed in claim 8 in which said flame responsive switching means is a unidirectional signal controlled solid state switch arranged to effect unidirectional current flow through said one relay winding in a direction opposite to the flow through said other relay winding.

10. A burner control system as claimed in claim 9 which includes a filtering capacitor connected across said other relay winding having sufficient capacitance to maintain hold-in energization of said winding during periods of circuit interruption which are considerably longer than the half cycle periods of the power supply during which said diode means is non-conductive.

* * * * *